Dec. 12, 1967  E. O. OHSOL  3,358,060
APPARATUS AND METHOD FOR EXTRUDING THICK FOAM PLASTIC
Filed June 25, 1965  2 Sheets-Sheet 1

INVENTOR
ERNEST O. OHSOL
BY
Cushman, Darby & Cushman
ATTORNEYS

Dec. 12, 1967         E. O. OHSOL         3,358,060
APPARATUS AND METHOD FOR EXTRUDING THICK FOAM PLASTIC
Filed June 25, 1965                2 Sheets-Sheet 2

INVENTOR
ERNEST O. OHSOL
BY Cushman, Darby & Cushman
ATTORNEYS

United States Patent Office 3,358,060
Patented Dec. 12, 1967

3,358,060
APPARATUS AND METHOD FOR EXTRUDING THICK FOAM PLASTIC
Ernest O. Ohsol, Wilmington, Del., assignor to Haveg Industries, Inc., Wilmington, Del., a corporation of Delaware
Filed June 25, 1965, Ser. No. 467,004
10 Claims. (Cl. 264—51)

This invention relates to the formation of thick bodies of foamed plastic material. More in particular, it relates to an extrusion process for forming thick foamed plastic sheet-like bodies having uniform density throughout and freedom from surface irregularities.

It is known that relatively thin foam plastic sheets and small diameter rods or the like can be produced by extrusion of foamable plastic material with ordinary extrusion techniques. For example, both sheets and rods can be produced by extruding the foamable material through a die of suitable configuration, a die having a slot-shaped orifice being employed for sheets and a die of more uniform transverse shape being employed for rods. Additionally, foam sheets may be made by extruding the plastic material through an annular die orifice in the shape of a thin walled tube and subsequently splitting the tube lengthwise. Foam plastic rods and sheets find utility in the fields of thermal insulation, package construction and boat or other buoyant construction.

The conventional extrusion techniques referred to above are suitable for producing sheets or slabs of relatively small thickness. When the thickness is large, however, the extruded sheet tends to develop surface irregularities and undesirable variations in density in the transverse direction. These defects apparently result from the expansion of the plastic material at right angles to the direction of extrusion. In the case of thin shapes all or substantially all the plastic is free to expand to its full extent, but in thicker shapes expansion of the innermost plastic tends to be contained or repressed by the outermost plastic thus producing density differences. In any event, regardless of the mechanism of expansion, thick extruded sheets tend to develop surface corrugations when the plastic expands. In the case of extruded thick rod-like shapes surface cracks or splits tend to develop. The thickness beyond which these difficulties develop varies with process conditions such as the expansion ratio of the material being extruded, extrusion rate and die shape. In general the undesirable features appear when the thickness exceeds about $\frac{1}{10}$ inch.

It is the object of the present invention to provide an improved process for making thick foam plastic shapes, particularly thick sheets, slabs or strips, which are free from the surface irregularities and density variations usually associated with thick foam extrusions, the process comprising radially extruding a foamable plastic from a die in the form of a cake-like foamed mass and simultaneously peeling off a continuous strip from the periphery of the cake with a knife. The width of the strip extends in the direction parallel to the axis of the extruder and equals the thickness of the cake at its periphery. The thickness of the strip is determined by the depth of the cut.

It is a further object of the present invention to provide apparatus for carrying out the above described radial extrusion and peeling off process. The extrusion part of the apparatus comprises any suitable extruder and die structure through which foamable plastic may be extruded in radial directions. The resulting cake of foam plastic is supported on a table disposed below the die, and the peeling off of a continuous strip of foam plastic is carried out by effecting relative circular movement between the cake and a cut-off knife. The knife may be mounted on the table so as to rotate therewith, or the knife may be fixed and the table and the cake rotated relative to the knife. Generally it will be desirable to have take-off rolls associated with the knife to aid in removing the strip from the remainder of the cake.

The invention will be further understood from the following detailed description taken with the drawing in which.

Figure 1:
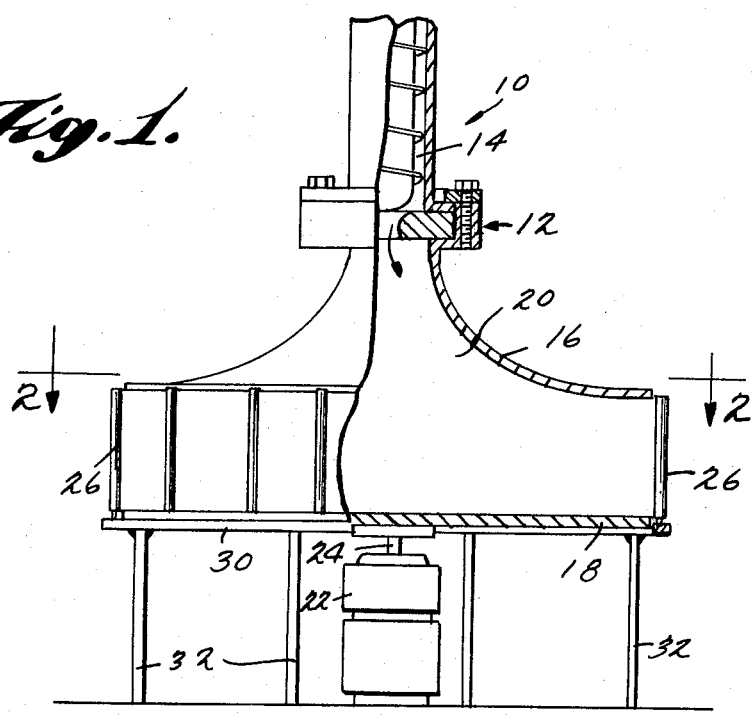
FIGURE 1 is an elevational view, partly broken away, of a radial extrusion and cutting apparatus embodying the principles of the present invention.

Referring to FIGURE 1 there is shown a vertically disposed stationary extruder 10 of conventional construction having a downwardly facing rotary extrusion die 12 adapted for extruding a conventional foamable plastic composition 14. Fixed to the die 12 and circumscribing the orifice thereof is a downwardly and radially outwardly curved extrusion guide 16. The guide 16 is symmetrical about the axis of extrusion and terminates at its lower end in a generally horizontal portion. The lower portion of the die and guide 16 rotate in synchronization with table 18 described below.

Disposed below the guide 16 and coaxial therewith is a horizontal rotary table 18 for receiving foaming plastic 20 from the extruder. A motor and gear reducer unit 22 is mounted below the table 18 and is drivingly connected to the latter by a vertical drive shaft 24 which is coaxial with the axis of extrusion. A plurality of vertically disposed guide rollers 26 are arranged slightly outwardly of the edge of the table 18 in circumferentially spaced apart relationship for engaging the peripheral edge of the foamed plastic 20. The rollers 26 are mounted in bearings at their lower ends on a horizontal support ring 30 which is supported from the floor on legs 32.

A fixed vertical knife 34 is disposed in a plane approximately tangent to the table 18 for cutting off a strip 36 or slab of plastic as the table 18 and plastic mass 20 are rotated. As shown, the knife 34 is supported by and coplanar with a flat vertical guide plate 38 which engages the freshly cut surface of the strip 36. A curved outer vertical guide plate 40 is provided for guiding the outer edge of the freshly cut strip 36 away from the remainder of the mass 20. A horizontal floor 42 extends between the guide plates 38 and 40 for supporting the lower edge of the strip 36.

Immediately adjacent the ends of the guide plates 38 and 40 is a pair of opposed endless belts 44 which grip the plastic strip 36 along its upper and lower edges and draw it out of the cutter and guide assembly. The belts 44 are driven by any suitable means such as a motor 46.

Figure 4:
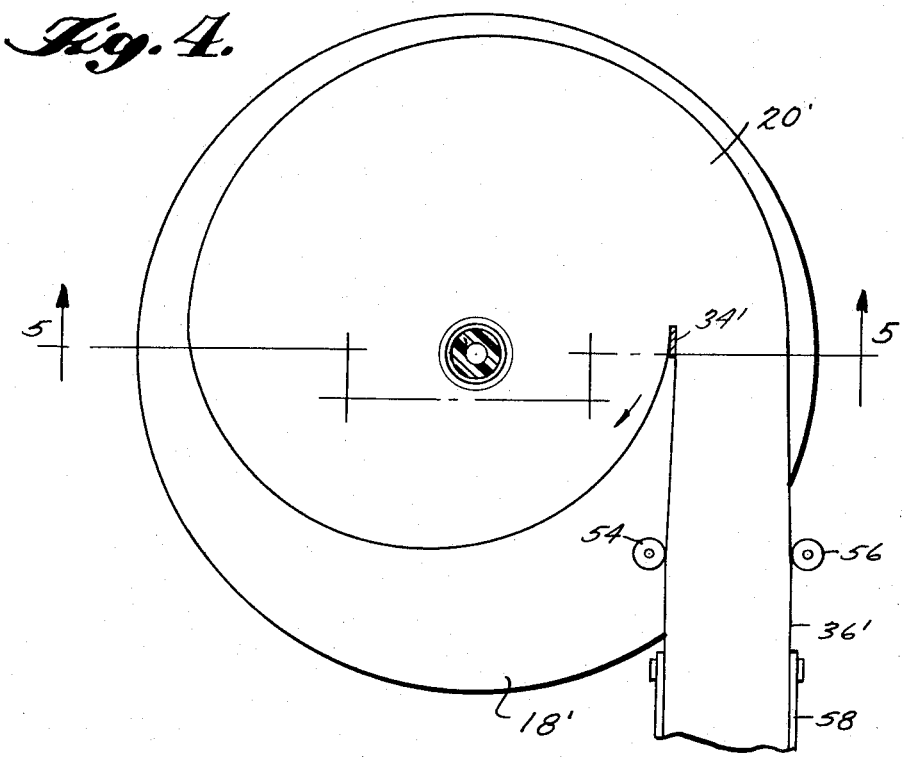
FIGURE 4 is a schematic plan view of a modified extrusion and cutting apparatus.
Figure 5:
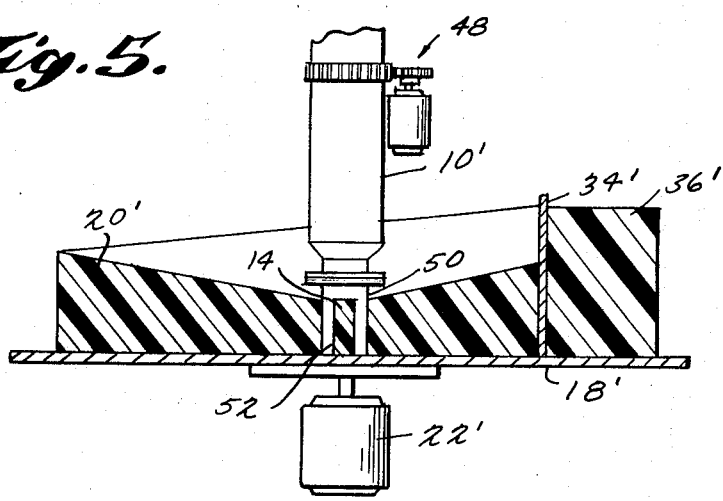
FIGURE 5 is a sectional view taken on the line 5—5 of FIGURE 4.

FIGURES 4 and 5 illustrate a somewhat different form of extrusion and cutting apparatus in which a vertically disposed extruder 10' is mounted for simultaneous rotation wtih a rotary table. The extruder 10' may be rotated in any suitable manner, a simple motor-driven gear arrangement 48 being shown to illustrate the principle. The rotary table 18' may be rotated from below by a suitable drive 22'.

In this embodiment the extruder 10' is provided with a hollow cylindrical die 50 having a plurality of straight, longitudinally extending slots 52 therein through which the foamable plastic 14' is extruded in radial directions.

The outer end of the die 50 is closed either by an end cap or by engagement with the upper surface of the table.

The cutting assembly of the embodiment of FIGURES 4 and 5 includes a fixed vertical knife 34' and a pair of driven rolls 54, 56. The latter engage the vertical sides of the strip 36' after it has been peeled from the plastic mass 20' and forward it to a conveyor belt 58. The knife 34' is disposed inwardly of the edge of the table 18' and normal to the table radius at that location.

Figure 2:
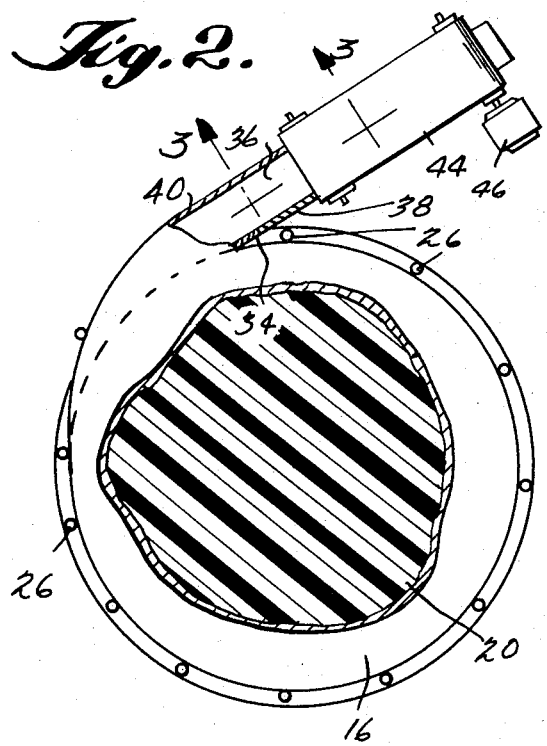
FIGURE 2 is a sectional view taken generally on the line 2—2 of FIGURE 1.
Figure 3:
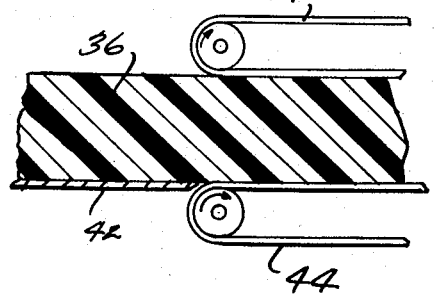
FIGURE 3 is a sectional view taken on the line 3—3 of FIGURE 2.

In operation of the embodiment of FIGURES 1–3 the table 18 is rotated continuously and the extruder 10 operates continuously in a fixed position. The foamable plastic flows downwardly and radially outwardly from the die 12 to fill the entire space between the die 12 and the table 18. While the actual extrusion direction is vertically downward, the foaming action of the plastic 14 as soon as it leaves the die 12, together with the guiding action of the guide 16 and the table 18, imparts a radially outward component of motion. The mass 20 therefore expands outwardly in all radial directions until it comes into contact with the freely rotatable rollers 26. Since the table 18 and consequently the plastic mass 20 are rotating, the movement of the periphery of the mass 20 past the rollers shapes the mass 20 into the pattern in which the rollers are disposed. Obviously a twisting action about the axis of rotation occurs within the more fluid center part of the plastic mass 20, because the extruder is stationary.

During rotation of the table 18 the periphery of the moving plastic mass 20 is guided by the rollers 26 and the guide plate 40 past the knife 34 so that the strip 36 is peeled from the mass 20. The peeling operation is aided by the endless belts 44 which are operated at constant speed equivalent to the speed at which the periphery of the mass 20 is moved past the knife 34.

In operation of the embodiment of FIGURES 4 and 5 both the extruder 10' and the rotary table 18' are rotated at the same constant speed. The foaming plastic 14' is continuously extruded through the die slots 52 and flows therefrom in radial directions. The slots 52 are close enough together so that the foaming plastic 14' seals itself together into a cake 20' of uniform density. In this embodiment the expanding plastic is allowed to expand naturally without the use of guides into the cake of increasing radius measured clockwise from the peel-off point. The knife 34' is disposed inwardly of the table edge so as to insure engagement with the plastic mass 20' as the latter is carried around by the table 18'. The driven take-off rolls 54 and 56 aid in the peeling-off operation by pulling the plastic strip 36' away from the table 18' at the same speed as the strip 36' is formed by the knife 34'.

The apparatus of FIGURES 4 and 5 may be modified to an arrangement in which the knife moves relative to a stationary extruder and a stationary plastic mass. Thus, the knife 34' and the rollers 54 and 56 may be carried by the rotary table 18' and the upper surface of the latter provided with a suitable slippery surface. In operation of the modified device the table slides relative to the plastic mass while moving the knife in a circular path about the extrusion axis. The resulting strip of plastic which is cut from the periphery of the mass is collected by a suitable windup device. Alternatively, the table could remain fixed and only the knife resolved in a circular path about the extrusion axis.

Thus it will be seen that in the process of the present invention continuous strips, slabs or sheets of foamed plastic are peeled from the periphery of a cake of foaming plastic, the latter being continually renewed from the center outwardly by a radial extrusion device. The width of the peeled-off piece lies in a direction parallel to the axis of the extruder and is equal to the vertical dimension of the foamed cake plus any further expansion which may take place after the piece has been removed from the cake. The thickness of the peeled-off piece is determined by the depth of the cut plus any subsequent expansion. In this regard it will be seen that in FIGURE 4 some expansion of the piece may take place after the cutting operation.

The process is capable of producing sheets up to 12–30 inches or more in width depending on the size of the extruder. The thickness of the sheets is limited to about 4 inches by the above-discussed tendency of foaming plastic to crack. In this regard it will be appreciated that the sheet should always be peeled off at the desired degree of expansion at a point well before the cake would tend to develop radial cracks. This can be attained by proper adjustment of the relationship between extrusion rate and table rotation and by selection of a suitable distance between the cut-off knife and the extrusion axis. The expansion ratio of the plastic material being foamed and other process variables also affect the point of take-off.

It will be understood that guides other than those illustrated may be employed for the foaming plastic and for the peeled-off strip. The location of the guides will be chosen to meet the requirements of the specific process, and the guides themselves may be rollers, plates or other suitable structures. Additionally, streams of compressed air may be employed to reduce the tendency to crack or to serve as further guides.

In making the foam slabs or sheets of the present invention there can be employed many different types of plastics.

When employing polystyrene there can be employed normal crystal grade polystyrene or high impact polystyrene or a mixture containing 5 to 95% normal crystal grade polystyrene and the balance high impact polystyrene. When employing a thermoplastic styrene polymer it normally contains greater than 50% by weight of styrene and preferably at least 70% by weight of styrene in its structure. Preferably, the polystyrene is at least 10% high impact polystyrene. High impact polystyrenes are frequently prepared by polymerizing monomeric styrene in the presence of 2 to 15% by weight of a rubbery diene polymer or by polymerizing styrene in the presence of such amounts of a difunctional material. Examples of high impact styrene include a terpolymer of 5% acrylonitrile, 5% butadiene and 90% styrene; a copolymer of 5% butadiene and 95% styrene; the product made by polymerizing 95% of styrene in the presence of 5% of polybutadiene; a copolymer of 5% chlorosulfonated polyethylene and 95% styrene; a blend of 97.5% polystyrene and 2.5% polybutadiene; a blend of 95% polystyrene and 5% hydrogenated polybutadiene containing 35.4% residual unsaturation; polystyrene formed in the presence of 5% hydrogenated polybutadiene containing 4.5% of residual unsaturation; a blend of 95% polystyrene and 5% polyisoprene, a blend of 98% polystyrene with 2% rubbery butadiene-styrene copolymer, a blend of 85% polystyrene with 15% rubbery butadiene-styrene copolymer, and a copolymer of 99.5% styrene and 0.5% divinyl benzene.

Unless otherwise indicated, all parts and percentages are by weight.

Other suitable thermoplastic resins and polymers include chlorinated rubber, cellulose ethers and esters, e.g., ethyl cellulose, cellulose acetate, celuose acetate-butyrate, bituminous materials, e.g. asphalt and coal tar pitch, paraffin wax, homopolymers and interpolymers of monomeric compounds containing the $CH_2=C$ grouping, such as olefins, e.g., ethylene, propylene isobutylene, butene-1, vinyl halides, e.g., vinyl chloride and vinyl fluoride, vinylidene chloride; vinyl esters of carboxylic acids, e.g., vinyl acetate, vinyl stearate, vinyl benzoate, vinyl ethers, e.g., vinyl methyl ether, vinyl ethyl ether, vinyl isobutyl ether; chlorotrifluoroethylene, tetrafluoroethylene, hexafluoropropylene, unsaturated carboxylic acids and derivatives thereof, e.g., acrylic acid, methacrylic acid, methyl acrylate, methyl alpha chloroacrylate, ethyl acrylate, methyl methacrylate, acrylamide, acrylonitrile, methacrylonitrile, and interpoymers of the above-mentioned vinylidene monomers with alpha, beta-unsaturated polycarboxylic acids and derivatives thereof, e.g., maleic anhydride, diethyl maleate, dibutyl fumarate, diallyl maleate, dipropyl maleate, etc. A preferred class of materials with which optimum results are obtained are rigid, relatively nonelastic, thermoplastic resins such as homopolymers and interpolymers of vinylchloride, e.g., polyvinyl chloride, vinyl chloride-vinyl acetate copolymer (87:13), vinyl chloride-acrylonitrile copolymer (80:20); homopolymers of vinyl aromatic hydrocarbons and ring halogenated derivatives thereof, e.g., styrene, o-chlorostyrene, p-chlorostyrene, 2,5-dichlorostyrene, 2,4-dichlorostyrene, p-methylstyrene, p-ethylstyrene, alphamethylstyrene, vinyl naphthalene and interpolymers of such vinyl monomers with each other and with other vinyl monomers in which the interpolymer contains at least 70% of the vinyl aromatic hydrocarbon compound, e.g., a copolymer of 70% styrene and 30% acrylonitrile. As previously indicated, for many uses the most preferred resins are thermoplastic styrene polymers containing at least 70% by weight styrene in the structure.

Additional suitable thermoplastic resins include polycarbonates, e.g., the polymer from bisphenol A and diphenyl carbonate; polyoxymethylene (Delrin), oxymethylene-alkylene oxide copolymers, e.g., oxymethylene-ethylene oxide (95:5) polyurethanes, e.g., prepolymers from toluene diisocyanate and polypropylene glycol molecular weight 2025; or glycerine propylene adduct molecular weight 3000 or butane diol 1,4-adipic acid polyester; Dacron (polyethylene terephthalate), nylon (e.g., polymeric hexamethylene adipamide). ABS terpolymers can be used, e.g., the terpolymer of 25% butadiene, 15% acrylonitrile and 60% styrene (a rigid ABS terpolymer), as well as other terpolymers containing 25 to 60% butadiene, 10 to 20% acrylonitrile, and 20 to 60% styrene.

The present invention is of particular value in preparing foamed articles from polyethylene (of high density, e.g., 0.960 medium density, e.g., 0.935 or low density, e.g., 0.014), polypropylene, copolymers of ethylene and propylene (e.g., 50:50 copolymer, 60:40 copolymer and 20:80 copolymer), regular or high impact polystyrene, acrylonitrile - butadiene - styrene terpolymer, polyvinyl chloride (preferably rigid polyvinyl chloride), copolymers of ethylene with minor amounts of alpha olefins having 4 to 10 carbon atoms such as butene-1 (e.g., 90:10 and 97.5:2.5) or octene-1 (96:4); terpolymers of ethylene, propylene and up to 5% of a nonconjugated polyolefin such as alloocimene, pentadiene-1,4 and dicyclopentadiene, e.g., a terpolymer of 60% ethylene, 39% propylene and 1% dicyclopentadiene or pentadiene-1,4.

There can be prepared foamed articles from fluorocarbon polymers such as polytetrafluoroethylene, polyhexafluoropropylene and tetrafluoroethylene-hexafluoropropylene copolymer (e.g., 50:50).

In forming the foamed plastic, there is preferably utilized a nucleating agent, e.g., in an amount of from 0.02 to 10%, preferably 0.4 to 5% of the weight of the polymer.

Conveniently, the nucleating agents are made up of two materials which react to form carbon dioxide and water. The two materials are normally used in approximately equivalent amounts. As the carbon dioxide liberating materials there can be used ammonium, alkali and alkaline earth carbonates or bicarbonates, e.g., ammonium bicarbonate, sodium bicarbonate, sodium carbonate, potassium bicarbonate, calcium carbonate. The other material is an acid or acid-reacting salt, preferably solid, which is sufficiently strong to liberate the carbon dioxide from the carbonate or bicarbonate. Generally, the acid has at least 3.0 milliequivalents of acidic hydrogen, and preferably at least 10.0 milliequivalents, per gram. The acid can be organic or inorganic. Suitable acidic materials include boric acid, sodium dihydrogen phosphate, fumaric acid, malonic acid, oxalic acid, citric acid, tartaric acid, potassium acid tartrate, chloroacetic acid, maleic acd, succinic acid, glutaric acid and phthalic acid. In places of the anhydrous acids or salts there can be used the solid hydrates, e.g., oxalic acid dihydrate and citric acid monohydrate.

While not essential, there can also be added a wetting agent such as Bayol 35 (a petroleum aliphatic hydrocarbon white oil), kerosene having an average of at least 8 carbon atoms in the molecule, alkylphenolalkylene oxide adducts e.g., Triton X-100 (t-octylphenol-ethylene oxide adduct having 10 ethylene oxide units in the molecule), sodium lauryl sulfate and sodium dodecylbenzene sulfonate. The wetting agent can be non-ionic or anionic.

One mode of incorporating the foaming agent into the polymer is by premixing the pelletized, solid, thermoplastic polymer, e.g., high impact styrene polymer, with a minor amount of an absorbent having absorbed thereon a volatile liquid (i.e., the foaming agent), which is non-reactive with and which has not more than a slight solvent action on the polymer. The volatile liquid should volatilize below the softening point of the polymer.

As the absorbent there can be employed any conventional absorbent in finely divided form, such as diatomaceous earth (Celite), fuller's earth, silica gel, e.g., Cab-O-Sil and Hi-Sil, activated alumina, molecular sieves, attapulgite clay and activated carbon. The absorbent is usually used in an amount of 0.1 to 15%, preferably 0.5 to 10% by weight of the polymer, although up to 25 or 30% of absorbent can be employed. The absorbent is an inert filler of large surface area but small particle size, e.g., 200 mesh or below.

As the volatile liquid there can be used aliphatic hydrocarbons boiling between 10° and 100° C., and preferably between 30° and 90° C., e.g., petroleum ether (containing primarily pentane or hexane or a mixture of these hydrocarbons), pentane, hexane, isopentane, heptane, cyclohexane, cyclopentane, pentadiene and neopentane. Other volatile liquids include methanol, ethanol, methyl acetate, ethyl acetate, butane, acetone, methyl formate, ethyl formate, dichloro-ethylene, dichlorodifluoromethane, perchloroethylene, dichlorotetrafluoroethane, isopropyl chloride, carbon tetrachloride, monochlorotrifluoroethylene, propionaldehyde, diisopropyl ether, dichlorodifluoromethane, a mixture of pentane with 5 to 30% of methylene chloride or other volatile lower halogenated hydrocarbon.

The amount of volatile liquid absorbed on the absorbent can vary from 5 to 150% or more based on the weight of the absorbent. The amount of liquid absorbed will depend upon the capacity of the absorbent for the particular liquid. Normally, the absorbent containing the volatile liquid will appear to be a dry powder. The volatile liquid employed should be one which is non-reactive with the particular polymer employed. Usually, the amount of volatile liquid will be 0.1 to 15% by weight of the polymer to be expanded. The amount of volatile liquid will depend upon the extent of foaming desired. In general, the greater the amount of absorbed volatile liquid in the polymer-absorbent mixture the more the expansion. It has been found that good expansion can be obtained using very small amounts of the volatile liquid.

The free-flowing powder consisting of the low boiling solvent or semi-solvent adsorbed on the inert filler of large surface area is added to the extrusion grade plastic pellets, preferably along with the nucleating agent, and tumbled in a mixer. The powder containing the volatile blowing agent will then disperse uniformly throughout the mixture while adhering to the palstic pellets. The mixture is then fed into the hopper of a screw extruder.

Instead of absorbing the volatile liquid on a filler, there can be employed conventional expansible thermoplastic materials such as expandible polystyrene containing 1 to 9% of one of the volatile liquids, e.g., Dow-Pelespan 101 (expansible polystyrene beads containing 6% pentane).

While specific embodiments of process steps and materials have been described, the details thereof are not intended to be limiting except as they appear in the appended claims.

What is claimed is:

1. A method for producing a thick strip of foamed plastic material comprising: extruding foamable plastic material radially in all directions from an axis thereby causing said material to expand and form a cake of continually increasing dimension normal to said axis; and continuously cutting a strip of foamed plastic from the periphery of said cake by imparting relative movement between said cake and a cutting member.

2. A method as in claim 1 wherein said relative movement is rotary movement about said axis.

3. A method as in claim 2 wherein said plastic material is extruded onto the surface of a rotating table.

4. A method as in claim 2 wherein said cake is rotated relative to a fixed cutting element.

5. A method as in claim 2 wherein said cake is fixed and said cutting operation is carried out by rotating said knife.

6. Apparatus for producing a thick strip of foamed plastic material comprising: extruder means for continuously extruding a foamable plastic material in all radial directions about a central axis so as to form a cake-like mass of foamed plastic material; a collection table having a flat surface disposed normal to said axis for receiving and supporting the cake-like mass; and means for cutting a continuous strip from the periphery of the cake-like mass, said means including a knife having a cutting edge extending generally parallel to said axis and disposed on a fixed radius relative to said axis.

7. Apparatus as in claim 6 further comprising spaced apart endless revolving members disposed adjacent said knife for engaging the strip after it has been cut from the cake-like mass.

8. Apparatus as in claim 6 including means for rotating said table about said axis, said extruder means and said knife being stationary.

9. Apparatus as in claim 6 including means for rotating said table about said axis and means for rotating said extruder about said axis, said knife being stationary.

10. Apparatus as in claim 6 including mechanical guide means spaced radially from said extruder for guiding the periphery of the cake-like mass into engagement with said knife.

References Cited

UNITED STATES PATENTS

| | | | |
|---|---|---|---|
| 1,918,127 | 7/1933 | Pfeiffer | 264—310 XR |
| 2,372,177 | 3/1945 | Conner | 264—311 XR |
| 2,740,157 | 4/1956 | McCurdy et al. | 264—53 |
| 3,164,654 | 1/1965 | Spencer | 264—311 |
| 3,303,251 | 2/1967 | Heider et al. | 18—12 |

FOREIGN PATENTS 1,276,131  10/1961  France.

ALEXANDER H. BRODMERKEL, *Primary Examiner.*

P. E. ANDERSON, *Assistant Examiner.*